United States Patent [19]

Mayhew

[11] Patent Number: 4,593,474

[45] Date of Patent: Jun. 10, 1986

[54] SURVEY VEHICLE

[76] Inventor: Thomas C. Mayhew, 1233 Vienna Way, West Wing, Marina del Rey, Calif. 90291

[21] Appl. No.: 668,479

[22] Filed: Nov. 5, 1984

[51] Int. Cl.$^4$ .................. G01C 5/00; G01C 15/00
[52] U.S. Cl. ............................... 33/264; 33/267; 33/299; 280/764.1
[58] Field of Search .............. 33/264, 267, 275 R, 33/281, 285, 291, 292, 299; 280/764.1, 765.1; 296/24 R

[56] References Cited

U.S. PATENT DOCUMENTS

| | | | |
|---|---|---|---|
| 3,709,617 | 1/1973 | Rascioni et al. | 33/281 |
| 3,716,923 | 2/1973 | Bazhaw | 33/264 |
| 3,767,226 | 10/1973 | Stephens | 280/764.1 |
| 3,857,582 | 12/1974 | Hartog | 280/764.1 |
| 4,490,919 | 1/1985 | Feist et al. | 33/264 |

FOREIGN PATENT DOCUMENTS

| | | | |
|---|---|---|---|
| 148984 | 6/1981 | Fed. Rep. of Germany | 33/264 |
| 7513 | 1/1983 | Japan | 33/275 R |

*Primary Examiner*—Richard R. Stearns
*Attorney, Agent, or Firm*—Cislo, O'Reilly & Thomas

[57] ABSTRACT

A mobile vehicle capable of stabilized observation of topographic features for land surveying is provided. The vehicle is adapted to convert to a stabilized observation platform by the use of stabilizing means, such as swing and lift apparatus mounted on the rear of the vehicle. Observation of topographic features is provided by mounting surveying apparatus, such as a digital theodolites, on gimbaled apparatus employing two axles which in turn is supported by extensible means to elevate the surveying apparatus above the roof of the vehicle. Means for raising a portion of the vehicle's roof to accommodate the elevated surveying apparatus is also provided. Computation may be accomplished in the field using a suitable computer powered by a suitable power supply. The computer may also be used to control the various stabilizing, gimbaled and extensible means. The survey vehicle of the invention provides a fully automated survey system enclosed in one mobile unit, permitting surveys to be completed in a fraction of the time normally required, while adding greater flexibility and enhanced reliability of measurements together with increased safety for personnel and equipment.

7 Claims, 5 Drawing Figures

SURVEY VEHICLE

BACKGROUND OF THE INVENTION

This invention relates in general to the field of surveying, and, in particular, to a mobile vehicle capable of stabilized observation of topographic features.

Land measurement and surveying for a wide variety of projects, such as residential development, building and road construction, and other civil engineering tasks, customarily involves extensive field surveys and preparation of detailed maps illustrating large amounts of precisely measured topographic and structural data. Current state of the art surveying apparatus includes digital laser theodolites. When combined with computers and appropriate software, measurement accuracy and economy of data analysis may be realized. However, the conventional approaches to surveying, requiring two people, tripod with a surveying instrument mounted thereon and a leveling rod, is not easily adaptable in light of the afore-mentioned advances in the art. Further, it would be desirable to provide protection for the surveyors and their equipment, as well as providing a faster and more accurate establishment of position of the surveying instrument.

OBJECTS AND SUMMARY OF THE INVENTION:

It is an object of this invention to provide a mobile vehicle capable of stabilized observation of topographic features for land surveying.

It is another object of this invention to provide means for adjusting the height and attitude of surveying instrumentation in the mobile vehicle.

It is still another object of this invention to provide means for collecting data and performing computations thereon of observations of topographic features.

It is yet another object of this invention to provide means for performing the computations at the site of the observations, regardless of weather conditions at the survey site.

It is still a further object of the invention to provide a random point instrument installation which allows for flexibility and adaptability to the landscape and environmental conditions encountered at the survey site.

These and further objects of the invention will become apparent from the hereinafter following commentary taken in conjunction with the drawing.

In accordance with the invention, a mobile means for land surveying is provided. The mobile means comprises a vehicle adapted to convert to a stabilized observation platform. The conversion is achieved by providing the vehicle with means for stabilizing the vehicle during observation. The conversion to a stabilized platform may be accomplished automatically by means of an electronically controlled sequential switching of the hydraulic system. Further, switching may be programmable and may be manually overridden to meet various field conditions. The vehicle is further provided with means for observing topographic features, including surveying instrumentation supported on a plate mounted on a two axle gimbal apparatus, which in turn is mounted on extensible means. The gimbal apparatus provides for near level conditions. A portion of the roof of the vehicle may be raised to accommodate the surveying instrumentation during the observation.

The mobile land surveying apparatus of the invention permits integration of a digital theodolite with a microcomputer, which provides a fully automated survey system enclosed in one mobile unit. Automatic leveling circuitry contained in the theodolite unit assures accurate measurements even with the instrument slightly out of level. Thus, very slight movements of the vehicle will not affect measurement accuracy. The apparatus of the invention permits surveys to be completed in a fraction of the time normally required, while providing greater flexibility and enhanced reliability, together with greater safety for the surveyors and equipment.

DESCRIPTION OF THE BEST EMBODIMENTS CONTEMPLATED

Figure 1:
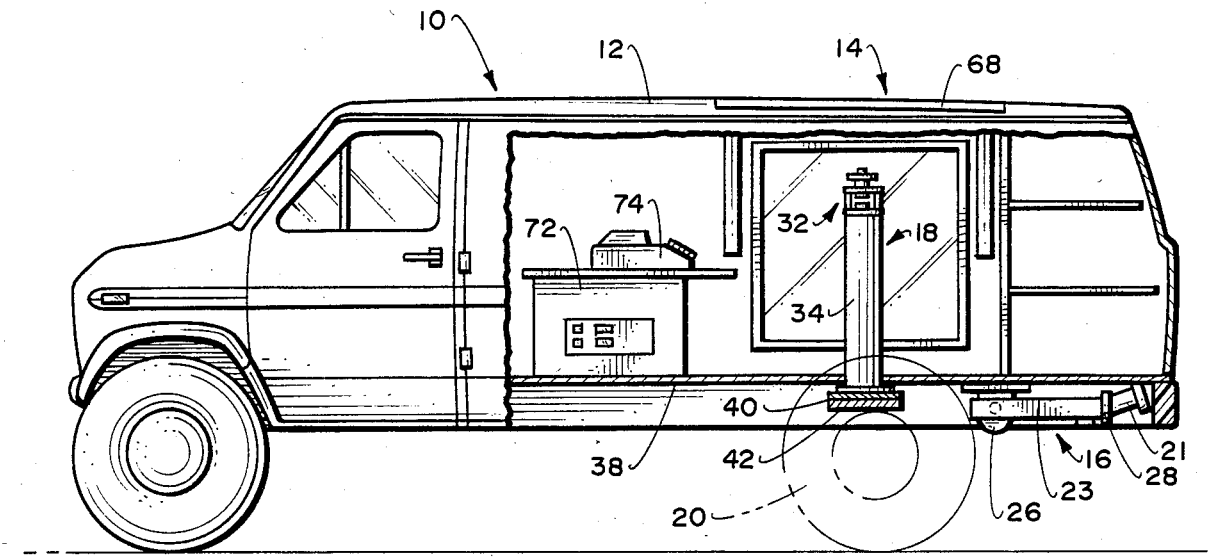
FIG. 1 depicts a side elevation view of a mobile land surveying apparatus of the invention, in partial cutaway.

Referring to the drawing wherein like numerals of reference designate like elements throughout, an enclosed vehicle 10 is suitably employed as the mobile land surveying apparatus of the invention. In particular, vehicles such as vans, preferably equipped with four-wheel drive for access to remote locations in rugged terrain, are preferred. The van is provided with a roof 11, a portion 14 of which is capable of being raised. Stabilizing means 16 provide stabilizing support when the vehicle is in the observation mode. Instrumentation support 18, capable of extension to lift the surveying instrumentation above the roof line for observation, is provided. Particular features of each of these elements are discussed below.

Figure 2:
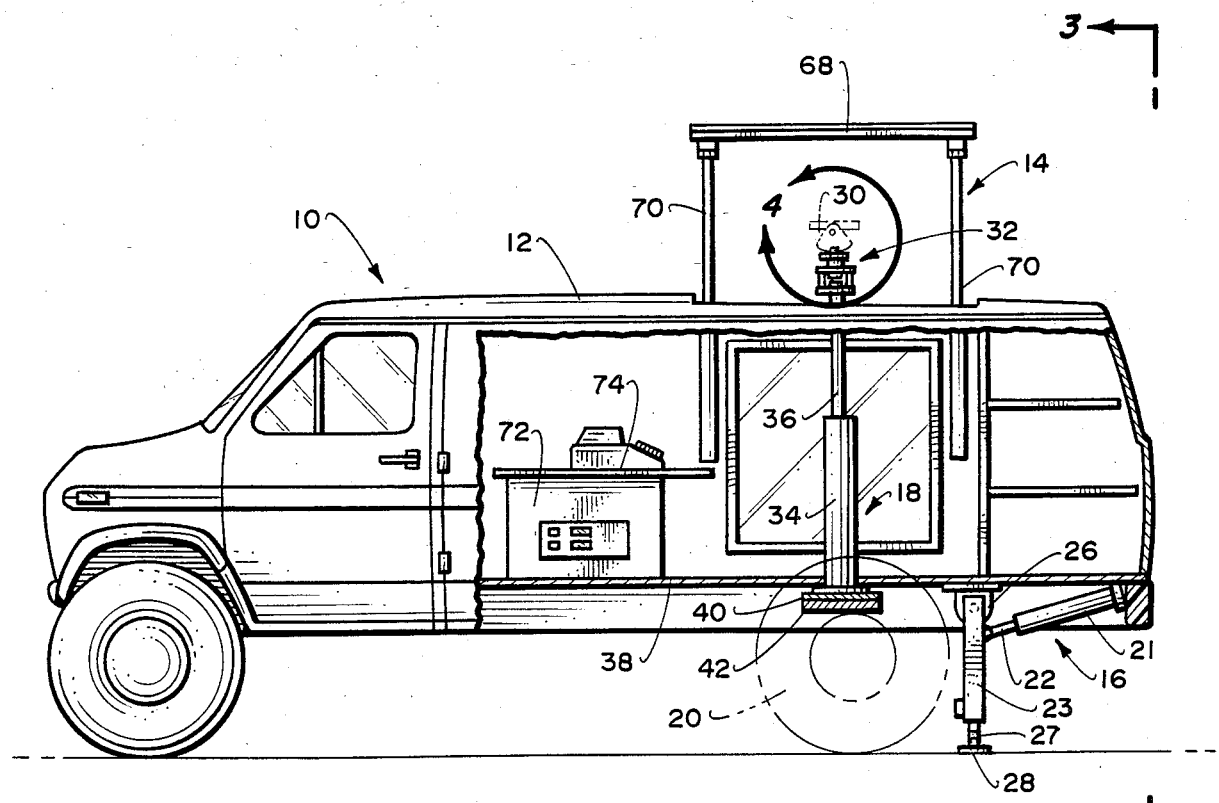
FIG. 2 depicts a side elevation view of the apparatus of FIG. 1, with a portion of the roof raised, in the observation position, with the stabilization bar in the extended positions.
Figure 3:
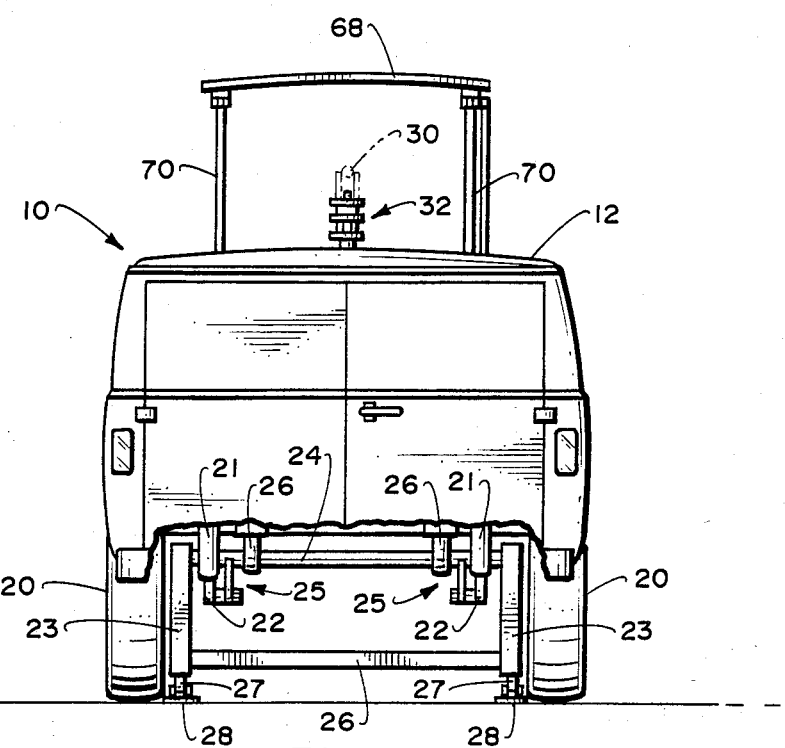
FIG. 3 depicts a rear view taken along line 3—3 of FIG. 2.

The stabilizing means 16 conveniently comprises apparatus known as swing and lift, shown in FIG. 2 in the stored (travelling) position and in FIG. 2 in the fully extended (observation) position. In a common configuration, the swing and lift apparatus is located behind rear wheels 20 and is hydraulically operated, comprising a swing hydraulic barrel 21 and an inner cylinder 22, the end of which is attached to a lift hydraulic barrel 23 by connection to upper bar 24 through swing crank level mechanism 25 (shown in FIG. 3). The upper bar 24 is attached to the frame of the vehicle (not shown) by brackets 26. The ends of the upper bar 24 are connected to the upper portion of the lift hydraulic barrel 23. The lift hydraulic barrel is further stabilized by means of a lower bar 26, which connects the bottom portions of the lift hydraulic barrels. Lifting and stabilizing of the vehicle is achieved by extension of inner cylinder 27, which terminates in stabilizer foot 28. When the vehicle is stopped for observation, the swing and lift apparatus is moved into position to provide stabilization of the vehicle during observation, as is also seen in FIG. 3.

The hydraulic system may be activated by sequential switching of limit switches, as those of ordinary skill in the art will recognize. Thus, conversion from the mobile state to the stationary state will be sequential and automatic. For example, the swing hydraulic members are extended, the lift arm is activated, and the roof hydraulics, and finally the column hydraulics are activated to put the system in readiness for survey use.

Surveying apparatus 30 is supported on a gimbaled apparatus 32, which in turn is supported by the instrumentation support 18. The surveying apparatus may be any of the instruments well-known in this field; advantageously, the surveying apparatus is a digital theodolite, such as commercially available digital laser theodolites.

The instrumentation support 18 is conveniently operated and comprises a support barrel 34 and telescoped, extensible inner rod 36. In order to provide rigid structural support, the support 34 passes through the vehicle floor 38 and is attached to a plate 40, which in turn is attached to a portion of the vehicle frame 42. In the fully extended position, the instrumentation support 18 maintains the surveying apparatus 30 in a position above the vehicle roof 12.

Figures 4, 5:
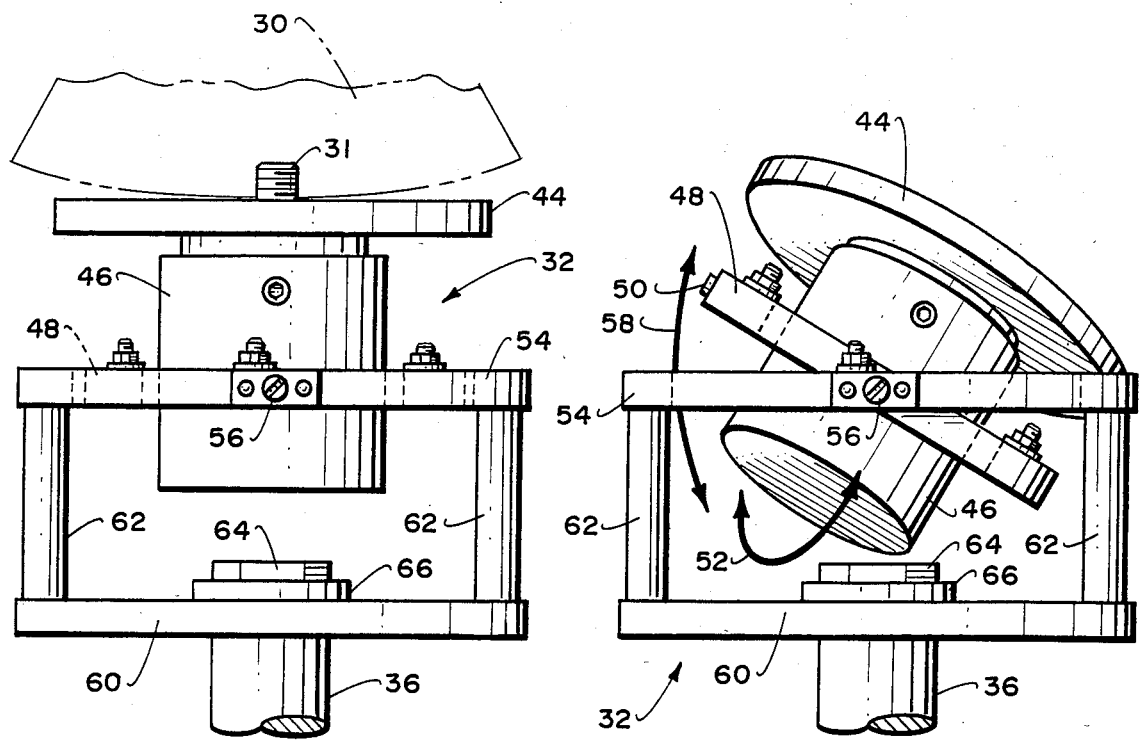
FIG. 4 depicts in greater detail the gimbal apparatus used to support the surveying apparatus shown in FIG. 2.
FIG. 5 depicts the positional aspects of the gimbal apparatus of FIG. 4.

As shown in greater detail in FIGS. 4 and 5, the gimbaled apparatus 32 has two axles and comprises an instrument support plate 44, to which the surveying apparatus 30 is secured, such as by a screw 31. The plate 44 is in turn secured to a support cylinder 46. First (inner) concentric ring 48 provides motion normal to first axle 50, or front to back, as depicted by double-headed arrow 52, while second (outer) concentric ring 54 provides motion normal to second axle 56, or side to side, as depicted by double-headed arrow 58. The second concentric ring is spaced apart from bottom plate 60 by rods 62 or a length adequate to provide clearance for the movement of the gimbaled apparatus. The bottom plate 60 is secured to the hydraulic cylinder 36 by a nut 64 and washer 66 assembly.

The extensible roof assembly 14, as shown in FIGS. 2 and 3, comprises a movable portion 68 of the roof, supported by hydraulic supports 70. Thus, when in the observation mode, depicted in FIGS. 2 and 3, a portion of the roof is extended upward to accommodate the upward extension of the surveying instrument 30 by the instrumentation support 18.

In order to take full advantage of the independence and mobility offered by the apparatus of the invention, a power inverter unit 72 and computer 74, shown in FIGS. 1 and 2, are also provided. The computer may have dual disk drives, not shown. The power inverter unit permits field surveys and computation to be performed directly at remote sites.

While many vehicles are suitably employed as the mobile land survey apparatus of the invention, the particular vehicle employed in demonstrating the feasibility of the invention was a Ford Econoline Super-Van, equipped with a Pathfinder four-wheel-drive conversion and the mechanical stabilization system 16 described above.

The apparatus of the invention permits interconnection of an on-board theodolite 30, such as commercially available Electronic Total Station (Digital Theodolite), which is linked directly to a suitable micro-computer 74. An instrument computer interface (not shown) allows data collection with the push of a button, thereby eliminating the possibility of transcription errors. Computations which previously had to be done in an office environment may be done in the field, employing the apparatus of the invention. Thus, surveying plots can be generated and checked while in the field. Presently available software is versatile enough to accommodate last minute plan changes and unforeseen obstacles. Further, data transmission to an associate's office is optionally provided by a modem interface and mobile telephone hook-up (not shown).

The survey system described above also includes suitable real-time sensors for environmental correction of geophysical measurements. The gimbaled apparatus 32 mounted on the vertical hydraulic cylinder 18 elevates the theodolite 30 to a convenient observation height through the hydraulically activated roof panel 68 (e.g., 4.5'×4.5'). The elevating stand 18, roof panel 68 and stabilization apparatus 16 are advantageously controlled by electrohydraulic activators and can be linked through the computer for automatic operation or may be independently controlled through a separate programmable controller.

In the operation mode, the computer records the observations and determines the theodolite position by means of, for example, a non-linear recursive least-squares data filter. During this process, the computer samples the environmental sensor data and applies correction factors to the angle and range measurements.

Thus, the system described above provides easy access to remote locations, with improved measurement accuracy and economy of data analysis. Surveys may be completed in a fraction of the time normally required, while providing greater flexibility and enhanced reliability. Instrument position is quickly and accurately established by sighting known points on the survey site. Finally, greater safety for personnel and equipment is provided by the mobile land survey apparatus of the invention.

Thus, there has been disclosed a mobile vehicle for land surveying, suitable for making precise measurements of topographic features and providing suitable computations thereof. Various modifications and changes will make themselves available to those of ordinary skill in the art and all such changes and variances not deviating from the spirit and essence of the invention are intended to be covered by the appended claims.

I claim:

1. Mobile apparatus for land surveying comprising a vehicle adapted to convert to a stabilized observation platform including:
   (a) retractable means for stabilizing said vehicle during observation; and
   (b) means for observing topographic features comprising:
      (1) surveying instrumentation supported by a plate mounted on gimbaled apparatus supported by an extensible means located in the interior of said vehicle, which, when extended, permits observation by said surveying instrumentation, and
      (2) means for raising a portion of the roof of said vehicle to accommodate said surveying instrumentation during observation.

2. The apparatus of claim 1 wherein:
   (a) said retractable means comprises swing and lift hydraulic apparatus; and
   (b) said means for observing topography features comprises:
      (1) said surveying instrumentation supported by said plate mounted on a two axle gimbaled apparatus supported by support apparatus attached to a frame member of said vehicle, and
      (2) said means for raising said portion of said roof comprises hydraulic means.

3. The apparatus of claims 1 or 2 further including a computer for analyzing measurements made by said surveying instrumentation and a power inverter for providing power to said computer.

4. The apparatus of claim 3 in which said surveying apparatus comprises a digital theodolite.

5. Mobile apparatus for land surveying comprising a vehicle having an enclosed body, including a roof, supported on wheels and adapted to convert to a stabilized observation platform comprising:
   (a) swing and lift hydraulic apparatus for stabilizing said vehicle during observation, located near the rear portion of said vehicle; and
   (b) means for observing topographic features comprising:
      (1) surveying instrumentation supported by a plate mounted on a two axle gimbaled apparatus supported by extensible means located in the interior of said vehicle and mounted on a frame member of said vehicle, and
      (2) hydraulic means for raising a portion of said roof to accommodate said surveying apparatus during observation.

6. The apparatus of claim 5 further including (a) a computer for analyzing measurements made by said surveying instrumentation, (b) control means for controlling said stabilizing apparatus, said extensible means and said hydraulic means for raising said portion of said roof and (c) a power inverter for providing power to said computer.

7. The apparatus of claim 6 in which said surveying apparatus comprises a digital theodolite.

* * * * *